US012106885B2

(12) United States Patent
Lim et al.

(10) Patent No.: US 12,106,885 B2
(45) Date of Patent: Oct. 1, 2024

(54) COIL COMPONENT

(71) Applicant: SAMSUNG ELECTRO-MECHANICS CO., LTD., Suwon-si (KR)

(72) Inventors: Seung Mo Lim, Suwon-si (KR); Byeong Cheol Moon, Suwon-si (KR); Dong Sik Yoo, Suwon-si (KR); Doo Ho Park, Suwon-si (KR); Tae Jun Choi, Suwon-si (KR); Jeong Hoon Ryou, Suwon-si (KR); No Il Park, Suwon-si (KR); Tai Yon Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/884,121

(22) Filed: Aug. 9, 2022

(65) Prior Publication Data

US 2022/0384086 A1 Dec. 1, 2022

Related U.S. Application Data

(63) Continuation of application No. 16/547,023, filed on Aug. 21, 2019, now Pat. No. 11,450,474.

(30) Foreign Application Priority Data

Oct. 12, 2018 (KR) ........................ 10-2018-0122108

(51) Int. Cl.
*H01F 27/28* (2006.01)
*H01F 27/24* (2006.01)
(Continued)

(52) U.S. Cl.
CPC ......... *H01F 27/2804* (2013.01); *H01F 27/24* (2013.01); *H01F 27/29* (2013.01);
(Continued)

(58) Field of Classification Search
CPC ......... H01F 27/2804; H01F 2027/2809; H01F 17/0013; H01F 17/0006; H01F 5/003;
(Continued)

(56) References Cited

U.S. PATENT DOCUMENTS 5,599,413 A 2/1997 Nakao et al.
6,535,095 B2 3/2003 Aoki et al.
(Continued)

FOREIGN PATENT DOCUMENTS

CN 1318852 A 10/2001
CN 203644518 U 6/2014
(Continued)

OTHER PUBLICATIONS

Chinese Office Action dated Aug. 29, 2022, issued in corresponding Chinese Patent Application No. 201910915486.4.
(Continued)

*Primary Examiner* — Tszfung J Chan
(74) *Attorney, Agent, or Firm* — Morgan, Lewis & Bockius LLP

(57) ABSTRACT

A coil component includes a body having one surface and another surface opposing each other, opposing end surfaces each connecting the one surface and the other surface to each other, and opposing side surfaces each connecting the end surfaces to each other. An internal insulating layer is embedded in the body, and a coil portion is disposed on at least one surface of the internal insulating layer and includes the first and second lead-out portions. The body has a recess disposed in each end surface of the body to expose the first and second lead-out portions. First and second external electrodes each include a connection portion disposed in the recess to be connected to a respective one of the first and second lead-out portions, and each include a pad portion
(Continued)

disposed on the one surface of the body. A filling portion fills the recess and covers the connection portion.

19 Claims, 10 Drawing Sheets

(51) Int. Cl.
*H01F 27/29* (2006.01)
*H01F 27/32* (2006.01)
*H01F 41/04* (2006.01)
*H01F 41/12* (2006.01)

(52) U.S. Cl.
CPC ......... *H01F 27/323* (2013.01); *H01F 41/041* (2013.01); *H01F 41/122* (2013.01); *H01F 2027/2809* (2013.01)

(58) Field of Classification Search
CPC ........ H01F 27/29; H01F 27/292; H01F 27/24; H01F 27/323
USPC .................................................. 336/200, 232
See application file for complete search history.

(56) References Cited

U.S. PATENT DOCUMENTS

| | | | | |
|---|---|---|---|---|
| 10,872,720 | B2 | 12/2020 | Shimizu | |
| 2001/0038327 | A1* | 11/2001 | Aoki | H01F 27/027 336/83 |
| 2013/0154770 | A1* | 6/2013 | Lee | H03H 7/0138 29/842 |
| 2014/0009254 | A1 | 1/2014 | Ohkubo et al. | |
| 2015/0084487 | A1* | 3/2015 | Mori | H01G 4/248 336/200 |
| 2017/0133146 | A1* | 5/2017 | Lee | H01F 41/042 |
| 2017/0309576 | A1* | 10/2017 | Kawabata | H01L 25/16 |
| 2018/0182537 | A1* | 6/2018 | Shimizu | H01F 27/29 |
| 2020/0013540 | A1* | 1/2020 | Kang | H01F 27/323 |
| 2020/0020477 | A1* | 1/2020 | Kang | H01F 17/0013 |
| 2020/0035401 | A1* | 1/2020 | Yoshinaka | H01F 27/324 |
| 2020/0035404 | A1* | 1/2020 | Lim | H01F 17/0013 |

FOREIGN PATENT DOCUMENTS

| | | | | |
|---|---|---|---|---|
| CN | 104916390 | A | 9/2015 | |
| CN | 108242321 | A | 7/2018 | |
| JP | 8-316766 | A | 11/1996 | |
| JP | 2007-165477 | A | 6/2007 | |
| JP | 2012-060013 | A | 3/2012 | |
| JP | 2013026392 | A * | 2/2013 | H01G 4/224 |
| JP | 2013-098283 | A | 5/2013 | |
| JP | 2014-013815 | A | 1/2014 | |
| JP | 2018-107346 | A | 7/2018 | |
| KR | 10-0127666 | B1 | 10/1997 | |
| KR | 10-2014-0005088 | A | 1/2014 | |
| KR | 10-1548862 | B1 | 8/2015 | |
| KR | 1548862 | B1 * | 8/2015 | H01F 17/0013 |

OTHER PUBLICATIONS

Korean Office Action dated Dec. 10, 2019 issued in Korean Patent Application No. 10-2018-0122108 {with English translation).

* cited by examiner

COIL COMPONENT

CROSS-REFERENCE TO RELATED APPLICATION(S)

This application is the continuation application of U.S. patent application Ser. No. 16/547,023 filed on Aug. 21, 2019, which claims benefit of priority to Korean Patent Application No. 10-2018-0122108 filed on Oct. 12, 2018 in the Korean Intellectual Property Office, the disclosure of which is incorporated herein by reference in its entirety.

BACKGROUND

1. Field

The present disclosure relates to a coil component.

2. Description of Related Art

An inductor, a coil component, is a representative passive electronic component commonly used in electronic devices together with resistors and capacitors.

In accordance with the implementation of high performance electronic devices and the miniaturization thereof, electronic components used in such electronic devices have increased in number and decreased in size. For this reason, there is an increasing demand to remove a source of the generation of noise such as electromagnetic interference (EMI) from electronic components.

In current EMI shielding technology, after an electronic component is mounted on a board, the electronic component and the board are simultaneously enclosed by a shield can. However, such current EMI shielding technology reduces an effective volume of a magnetic material in a shielding region and thereby degrades performance of the electronic component.

To address the above-mentioned issue, a technology of disposing a shielding layer on an electronic component itself such as a coil component, or the like, has been developed. In this case, there is a need for a bottom surface electrode structure in which external electrodes of an electronic component are only formed on a mounting surface of the electronic component so as to achieve efficient EMI shielding of the electronic component.

SUMMARY

An aspect of the present disclosure is to provide a small, light, thin, and short coil component.

Another aspect of the present disclosure is to provide a coil component allowing a bottom surface electrode structure to be easily formed.

Another aspect of the present disclosure is to provide a coil component significantly reducing magnetic material loss.

According to an aspect of the present disclosure, a coil component includes a body having one surface and another surface opposing each other, opposing end surfaces each connecting the one surface and the other surface to each other, and opposing side surfaces each connecting the end surfaces to each other. An internal insulating layer is embedded in the body, and a coil portion is disposed on at least one surface of the internal insulating layer and includes first and second lead-out portions. The body has a recess disposed in a corner of each end surface of the body to expose the first and second lead-out portions. First and second external electrodes each include a connection portion disposed in the recess to be connected to a respective one of the first and second lead-out portions, and each include a pad portion disposed on the one surface of the body. A filling portion fills the recess and covers the connection portion of each of the first and second external electrodes.

According to another aspect of the present disclosure, a coil component includes a body having one surface and another surface opposing each other, and opposing end surfaces each connected to the other surface, where the body includes a recess disposed in each of the opposing end surfaces and extending to the one surface. A coil is embedded in the body, and has first and second lead-out portions each exposed to the recess along a respective one of the opposing end surfaces of the body. First and second external electrodes each include a connection portion extending into the recess along a respective one of the opposing end surfaces of the body to contact a respective one of the first and second lead-out portions, and each include a pad portion disposed on the one surface of the body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
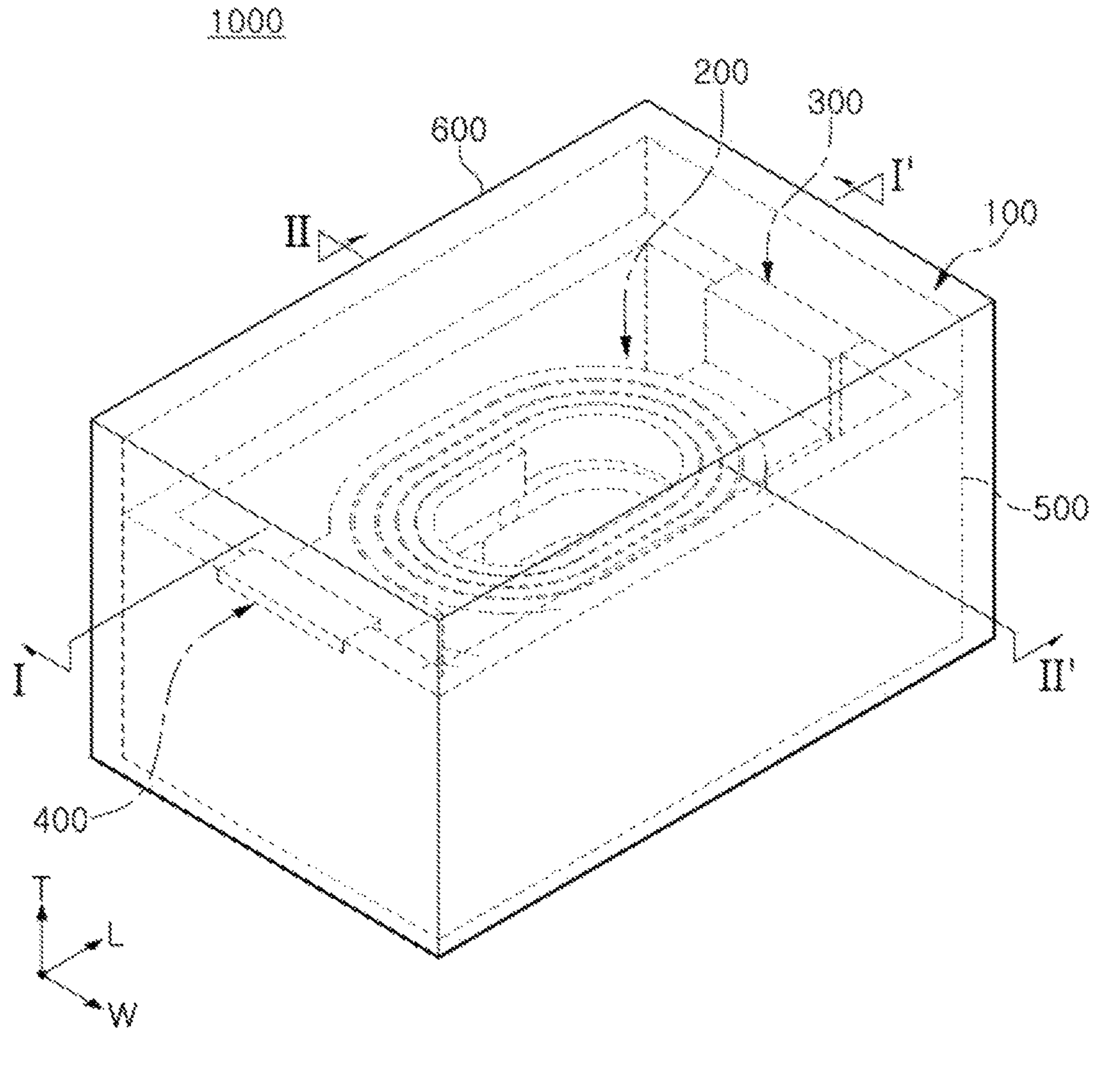
FIG. 1 is a schematic diagram of a coil component according to a first embodiment in the present disclosure.

Hereinafter, embodiments of the present disclosure will be described as follows with reference to the attached drawings.

The terms used in the example embodiments are used to simply describe an example embodiment, and are not intended to limit the present disclosure. A singular term includes a plural form unless otherwise indicated. The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof. Also, the term "disposed on," "positioned on," and the like, may indicate that an element is positioned below an object, and does not necessarily mean that the element is positioned on the object with reference to a gravity direction.

The term "coupled to," "combined to," and the like, may not only indicate that elements are directly and physically in contact with each other, but also include configurations in which one or more other element(s) are interposed between the elements such that the elements are also in contact with the other component.

Sizes and thicknesses of elements illustrated in the drawings are indicated as examples for ease of description, and example embodiments in the present disclosure are not limited thereto.

In the drawings, an L direction is a first direction or a length direction, a W direction is a second direction or a width direction, and a T direction is a third direction or a thickness direction.

In electronic devices, various types of electronic components may be used, and various types of coil components may be used between the electronic components to remove noise, or for other purposes.

In other words, in electronic devices, a coil component may be used as a power inductor, a high frequency inductor, a general bead, a high frequency bead, a common mode filter, and the like.

First Embodiment

Figure 2:
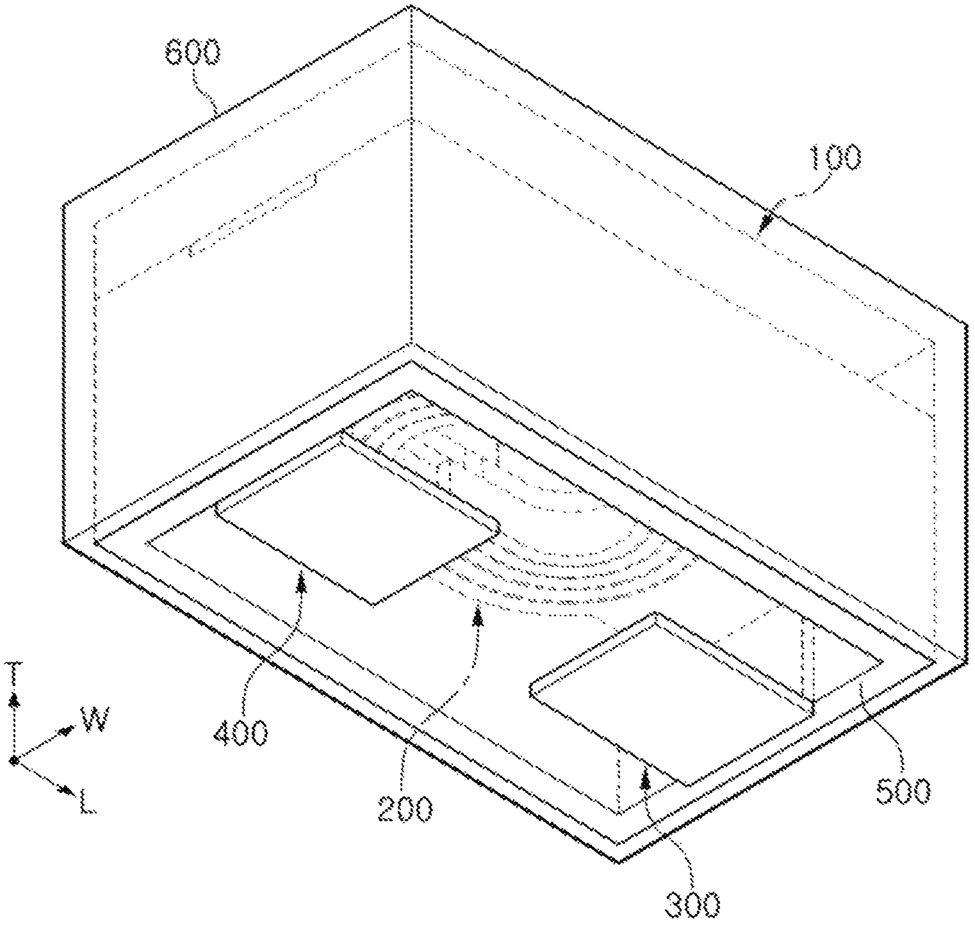
FIG. 2 is a diagram showing the coil component according to the first embodiment when viewed from a lower side of FIG. 1.
Figure 3:
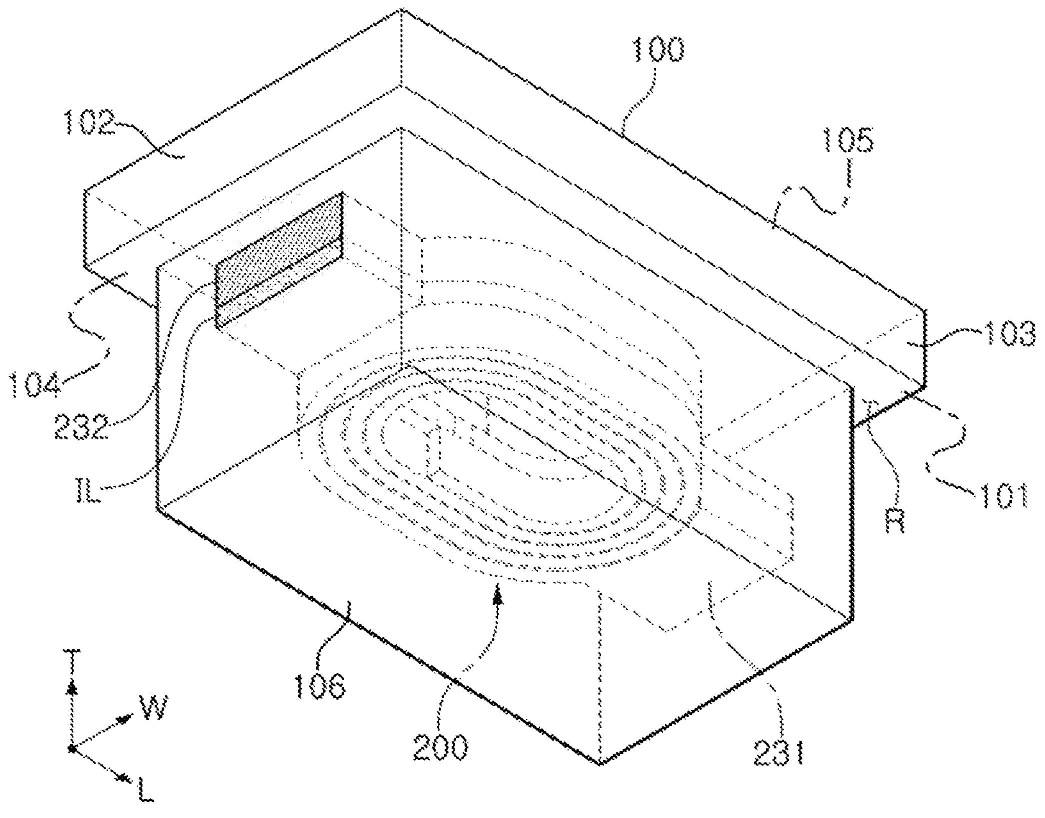
FIG. 3 is a diagram showing the coil component of FIG. 2 and excluding some portions thereof.
Figure 4:
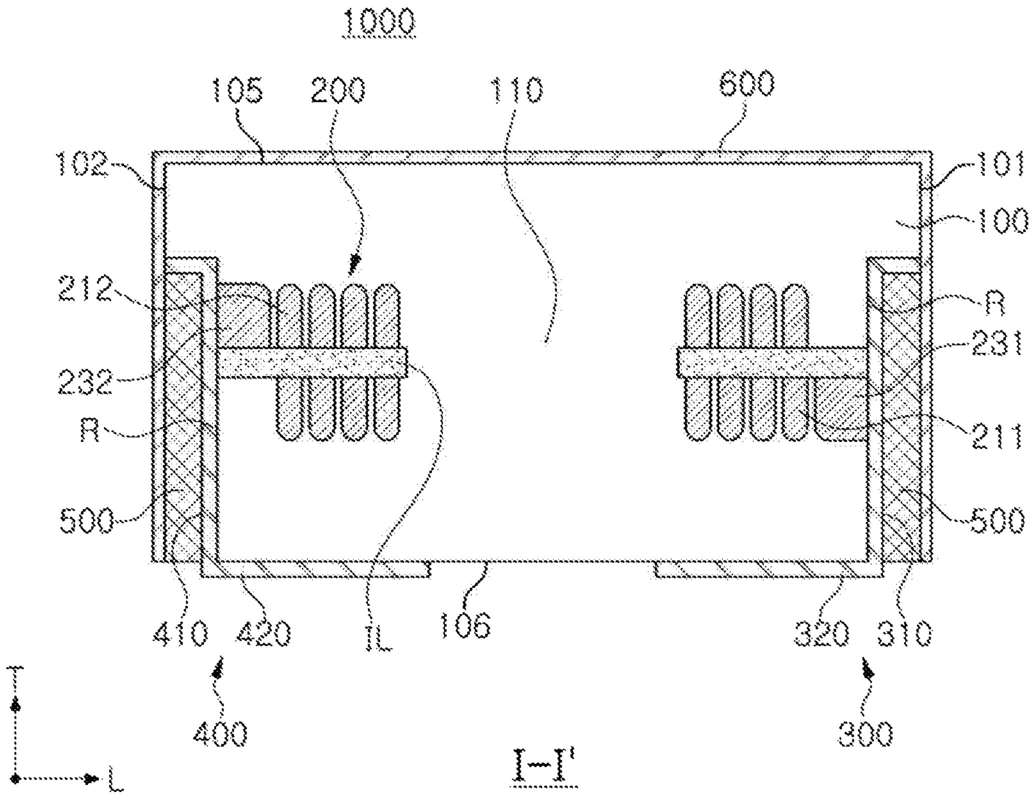
FIG. 4 is a cross-sectional view of the coil component taken along line I-I' of FIG. 1.
Figure 5:
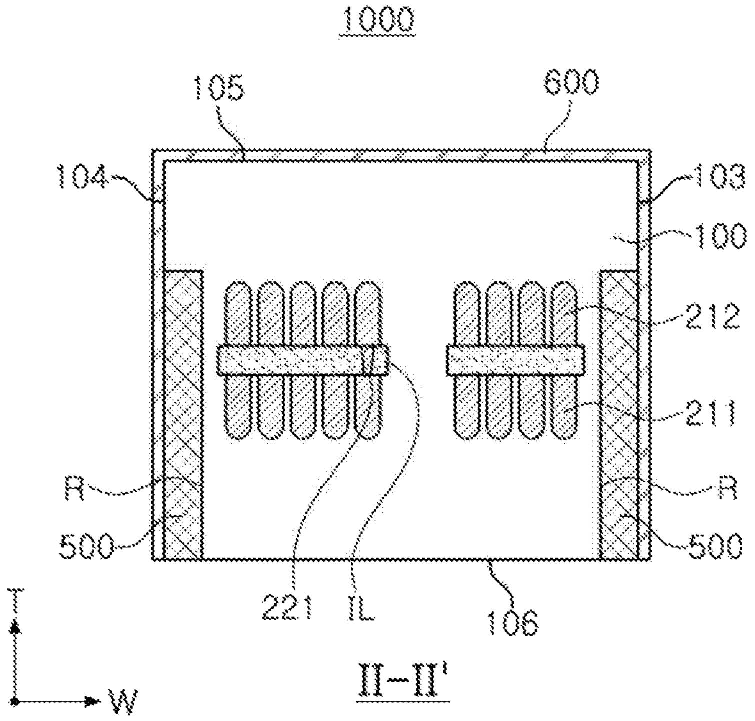
FIG. 5 is a cross-sectional view of the coil component taken along line II-II' of FIG. 1.

FIG. 1 is a schematic diagram of a coil component according to a first embodiment in the present disclosure. FIG. 2 is a diagram showing the coil component according to the first embodiment viewed from a lower side of FIG. 1, and FIG. 3 is a diagram showing the coil component of FIG. 2 and excluding some portions thereof. Specifically, FIG. 3 illustrates the coil component excluding a cover layer, a filling portion, and external electrodes illustrated in FIG. 2. FIG. 4 is a cross-sectional view of the coil component taken along line I-I' of FIG. 1, and FIG. 5 is a cross-sectional view of the coil component taken along line II-II' of FIG. 1.

Referring to FIGS. 1 to 5, a coil component 1000 according to an example embodiment may include a body 100, an internal insulating layer IL, a coil portion 200, a recess R, external electrodes 300 and 400, and a filling portion 500, and may further include a cover layer 600.

The body 100 may form an exterior of the coil component 1000, and the coil portion 200 is embedded in the body 100.

The body 100 may have a substantially hexahedral shape.

The body 100 may have, on the basis of FIGS. 1 to 5, a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. The first to fourth surfaces 101, 102, 103, and 104 of the body 100 may correspond to wall surfaces of the body 100 connecting the fifth surface 105 and the sixth surface 106 of the body 100. Hereinafter, "both end surfaces of the body 100" will refer to the first surface 101 and the second surface 102, and "both side surfaces of the body 100" will refer to the third surface 103 and the fourth surface 104 of the body 100.

As an example, the body 100 may be formed such that the coil component 1000, on which the external electrodes 300 and 400, the filling portion 500, and the cover layer 600 to be described later are disposed, may have a length of 2.0 mm, a width of 1.2 mm, and a thickness of 0.65 mm, but the formation of the body 100 is not limited thereto.

The body 100 may include a magnetic material and a resin material. Specifically, the body 100 may be formed by laminating one or more magnetic composite sheets including a magnetic material dispersed in a resin. Alternatively, the body 100 may have a structure different from the structure in which a magnetic material is dispersed in a resin. For example, the body 100 may be formed of a magnetic material such as a ferrite.

The magnetic material may be a ferrite or magnetic metal powder particles.

The ferrite power particles may include at least one of, for example, spinel type ferrites such as ferrites that are Mg—Zn-based, Mn—Zn-based, Mn—Mg-based, Cu—Zn-based, Mg—Mn—Sr-based, Ni—Zn-based, hexagonal ferrites such as ferrites that are Ba—Zn-based, Ba—Mg-based, Ba—Ni-based, Ba—Co-based, Ba—Ni—Co-based, or the like, garnet ferrites such as Y-based ferrite, and Li-based ferrite.

Magnetic metal powder particles may include at least one selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particles may include at least one of pore ion power particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles, and Fe—Cr—Al-based alloy powder particles.

The metallic magnetic powder particles may be amorphous or crystalline. For example, the magnetic metal powder particles may be Fe—Si—B—Cr-based amorphous alloy powder particles, but is not limited thereto.

Each of the ferrite and the magnetic metal powder particles may have an average diameter of about 0.1 μm to about 30 μm, but an example of the average diameter is not limited thereto.

The resin may include epoxy, polyimide, liquid crystal polymer, and the like, alone or in combination, but a material of the resin is not limited thereto.

The recess R may be formed to surround (e.g., to extend along an outer side of) the first to fourth surfaces 101, 102, 103, and 104 of the body 100 along the sixth surface 106 of the body 100. For example, the recess R may be formed along an entire edge region in which each of the first to fourth surfaces 101, 102, 103, and 104 of the body 100 and the sixth surface 106 of the body 100 are formed. The recess R does not extend to the fifth surface 105 of the body 100, and may remain spaced apart from the fifth surface 105. For example, the recess R does not penetrate through the entirety of the body 100 in the thickness direction of the body 100.

The recess R may be formed by pre-dicing a boundary line (a dicing line or a singulation line) between respective bodies 100 at a side of one surface of a coil bar. A pre-dicing tip, used in the pre-dicing, may have a width greater than a width of a dicing line of the coil bar. The term "coil bar" refers to a state in which a plurality of bodies 100 are connected to each other in the length direction and the width direction of the body. The term "width of a dicing line" refers to a width of a full-dicing tip of full-dicing performed to individualize the coil bar into the plurality of bodies 100.

During such pre-dicing, a width of the pre-dicing may be adjusted such that a portion of each of lead-out portions 231 and 232 to be described later may be removed together with a portion of the body 100. For example, the width of the pre-dicing may be adjusted such that the lead-out portions 231 and 232 are exposed to an internal surface of the recess R. However, the width of the pre-dicing may be adjusted so as not to penetrate through an entirety of the coil bar from one surface (e.g., 106) to an opposing surface (e.g., 105). Thus, even after the pre-dicing, the coil bar is maintained in a state in which the plurality of bodies are connected to each other.

An internal wall and a bottom surface of the recess R, the internal surface of the recess R, also constitute a surface of the body 100. However, for ease of description, the internal wall and the bottom surface of the recess R will be distinguished from the surface of the body 100.

The internal insulating layer IL is embedded in the body 100. The internal insulating layer IL is configured to support the coil portion 200 to be described later.

The internal insulating layer IL may be formed of an insulating material including at least one of thermosetting insulating resins such as an epoxy resin, thermoplastic insulating resins such as polyimide, and photosensitive insulating resins, or an insulating material in which a reinforcing material such as glass fiber or an inorganic filler is impregnated in this insulating resin. As an example, the internal insulating layer IL may be formed of an insulating material such as prepreg, an Ajinomoto build-up film (ABF), FR-4, a Bismaleimide Triazine (BT) resin, a photoimageable dielectric (PID), or the like, but is not limited thereto.

The inorganic filler may be at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the internal insulating layer IL is formed of an insulating material containing a reinforcing material, the internal insulating layer IL may provide more excellent rigidity. When the internal insulating layer IL is formed of an insulating material including no glass fiber, the internal insulating layer IL is advantageous for thinning of the entire coil portion 200. When the internal insulating layer IL is formed of an insulating material including a photosensitive insulating resin, the number of process steps may be decreased, which is advantageous for a decrease in manufacturing costs, and a fine via may be formed.

The coil portion 200 may be embedded in the body 100 to exhibit characteristics of a coil component. For example, when the coil component 1000 according to this embodiment is used as a power inductor, the coil portion 200 may serve to stabilize power of an electronic device by storing an electric field as a magnetic field and maintaining an output voltage.

The coil portion 200, applied to this embodiment, may include coil patterns 211 and 212, a via 221, and lead-out portions 231 and 232.

Specifically, as shown in FIGS. 4 and 5, the first coil pattern 211 and the first lead-out portion 231 are disposed on a bottom surface of the internal insulating layer IL, facing towards the sixth surface 106 of the body 100, and the second coil pattern 212 and the second lead-out portion 232 are disposed on a top surface of the internal insulating layer IL opposing the bottom surface of the internal insulating layer IL. The first coil pattern 211 and the first lead-out portion 231 may be in contact (e.g., direct contact) with each other and connected to each other, and the second coil pattern 212 and the second lead-out portion 232 may be in contact (e.g., direct contact) with each other and connected to each other. The via 221 may penetrate through the internal insulating layer IL to connect the first coil pattern 211 and the second coil pattern 212 to each other. As a result, the coil portion 200 including the first and second coil patterns 211 and 212 may generally serve as a single coil.

Each of the first coil pattern 211 and the second coil pattern 212 may have a planar spiral shape forming at least one turn centered on the core 110 as an axis. For example, the first coil pattern 211 and may form at least one turn on a bottom surface of the internal insulating layer IL centered on the core 110 as an axis.

Each of the lead-out portions 231 and 232 may be exposed to the internal surface of the recess R. During a process of forming the recess R, a portion of each of the lead-out portions 231 and 232 may be removed together with a portion of the body 100. For example, the recess R may extend to the first lead-out portion 231 and the second lead-out portion 232. Accordingly, the first and second external electrodes 300 and 400 to be described later may be formed on (e.g., in contact with) the first and second lead-out portions 231 and 232, respectively, exposed to the internal surface of the recess R, such that the coil portion 200 and the first and second external electrodes 300 and 400 may be connected to each other.

In FIGS. 3 to 5, the recess R is illustrated as penetrating through upper and lower portions of the lead-out portions 231 and 232 to expose the lead-out portions 231 and 232 to the internal wall of the recess R, but that is merely an example. As another unlimited example, a depth of the recess R may be adjusted during pre-dicing, allowing the recess R to penetrate through the first lead-out portion 231 while preventing the recess R from penetrating through the second lead-out portion 232. In this case, the first lead-out portion 231 may be exposed to the internal wall of the recess R, and the second lead-out portion 232 may be exposed to both a bottom surface and the internal wall of the recess R. As a further unlimited example, a depth of the recess R, formed in a side of the first surface 101 of the body 100, may be different from a depth of the recess R formed in a side of the second surface 102 of the body.

One surface of each of the lead-out portions 231 and 232, exposed to internal surface of the recess R, may have a higher surface roughness than the other surfaces of the lead-out portions 231 and 232. For example, when the lead-out portions 231 and 232 are formed by plating and the recess R is formed by the pre-dicing described above, a portion of each of the lead-out portions 231 and 232 may be removed by a pre-dicing tip. Accordingly, the one surface of each of the lead-out portions 231 and 232, exposed to the internal surface of the recess R, are formed to have a higher surface roughness than the other surfaces of the lead-out portions 231 and 232 due to polishing of each of the one surfaces by the pre-dicing tip. As will be described later, each of the external electrodes 300 and 400 may be formed as a thin film to have low bonding force with the body 100. Since each external electrode 300 and 400 is in contact with and connected to a respective one of the lead-out portions 231 and 232 having relatively higher surface roughness, bonding force between the external electrodes 300 and 400 and the lead-out portions 231 and 232 may be improved.

At least one of the coil patterns 211 and 212, the via 221, and the lead-out portions 231 and 232 may include at least one conductive layer.

As an example, when the second coil pattern 212, the via 221, and the second lead-out portion 232 are formed on the other surface of the internal insulating layer IL by plating, each of the second coil pattern 212, the via 221, and the second lead-out portion 232 may include a seed layer such as an electroless plating layer and an electroplating layer. The electroplating layer may have a single-layer structure or a multilayer structure. The electroplating layer of the multilayer structure may be formed in a conformal film structure in which one electroplating layer is covered with another electroplating layer, and may be formed so that another plating layer is laminated only on one surface of one electroplating layer. A seed layer of the second coil pattern 212, a seed layer of the via 221, and a seed layer of the second lead-out portion 232 may be formed integrally with each other, such that boundaries therebetween may not be formed, but the disclosure is not limited thereto. The electroplating layer of the second coil pattern 212, the electroplating layer of the via 221, and the electroplating layer of the second lead-out portion 232 may be formed integrally with each other, such that a boundary therebetween is not formed, but are not limited thereto.

As another example, when the coil portion 200 is formed on the basis of the direction of FIGS. 4 and 5 by separately forming a first coil pattern 211 disposed on a bottom surface side of the first internal insulating layer IL and a second coil pattern 212 disposed on a top surface side of the internal insulating layer IL and then collectively laminating the first and second coil patterns 211 and 212 on the internal insulating layer IL, the via 220 may include a high-melting point metal layer and a low-melting point metal layer having a melting point lower than a melting point of the high-melting point metal layer. The low-melting point metal layer may be formed of a solder including lead (Pb) and/or tin (Sn). At least a portion of the low-melting point metal layer may be melted by a pressure and a temperature during the collective lamination, such that an inter-metallic compound (IMC) layer may be formed in a boundary between the low-melting point metal layer and the second coil pattern 212.

As an example, as illustrated in FIGS. 4 and 5, the coil patterns 211 and 212 and the lead-out portions 231 and 232 may be formed to protrude from the bottom and top surfaces of the internal insulating layer IL, respectively. As another example, the first coil pattern 211 and the first lead-out portion 231 may be formed to protrude on the bottom surface of the internal insulating layer IL, and the second coil pattern 212 and the second lead-out portion 232 may be embedded in the top surface of the internal insulating layer IL such that top surfaces thereof may be exposed to the top surface of the internal insulating layer IL. In this case, a concave portion may be formed in the top surface of the second coil pattern 212 and/or the top surface of the second lead-out portion 232, such that the top surface of the internal insulating layer IL, the top surface of the second coil pattern 212, and/or the top surface of the second lead-out portion 232 may not be disposed on the same plane. As another example, the second coil pattern 212 and the second lead-out portion 232 may be formed to protrude on the top surface of the internal insulating layer IL, and the first coil pattern 211 and the first lead-out portion 231 may be embedded in the bottom surface of the internal insulating layer IL so that the bottom surface thereof may be exposed to the bottom surface of the internal insulating layer IL. In this case, a concave portion may be formed in the bottom surface of the first coil pattern 211 and/or the bottom surface of the first lead-out portion 231, such that the bottom surface of the internal insulating layer IL, the bottom surface of the first coil pattern 212, and/or the bottom surface of the first lead-out portion 231 may not be disposed on the same plane.

Each of the coil patterns 211 and 212, the via 221, and the lead-out portions 231 and 232 may be formed of copper (Cu), aluminum (Al), silver (Ag), tin (Sn), Nickel (Ni), lead (Pb), titanium (Ti), or alloys thereof, but a material thereof is not limited thereto.

The external electrodes 300 and 400 include respective connection portions 310 and 410, disposed in the recess R to be connected to the lead-out portions 231 and 232, respectively, and respective pads portions 320 and 420 disposed on the sixth surface 106 of the body 100. The external electrodes 300 and 400 are spaced apart from each other. The first external electrode 300 and the second external electrode 400 are electrically connected by the coil portion 200, but are spaced apart from each other on the surface of the body 100 and the recesses R.

Specifically, the first external electrode 300 includes a first connection portion 310, disposed on a region, in which the first lead-out portion 231 is exposed, in the internal surface of the recess R to be in contact with and connected to the first lead-out portion 231, and a first pad portion 320 extending from the first connection portion 310 to the sixth surface 106 of the body 100. The second external electrode 400 includes a second connection portion 410, disposed in a region, in which the second lead-out portion 232 is exposed, in the internal surface of the recess R, and a second pad portion 420 extending from the second connection portion 410 to the sixth surface 106 of the body 100.

Each of the external electrodes 300 and 400 is formed along the internal surface of the recess R and the sixth surface 106 of the body 100. For example, each of the external electrodes 300 and 400 takes the form of a conformal layer.

Each of the external electrodes 300 and 400 may be integrally formed on the internal surface of the recess R and the sixth surface 106 of the body 100. For example, the first connection portion 310 and the first pad portion 320 of the first external electrode 300 may be formed together in the same process to be integrated with each other, and the second connection portion 410 and the second pad portion 420 of the second external electrode 400 may be formed together in the same process to be integrated with each other. The external electrodes 300 and 400 may be formed by a thin-film process such as a sputtering process.

The external electrodes 300 and 400 may be formed of a conductive material such as copper (Cu), aluminum (Al), silver (Ag), tin (Sn), gold (Au), nickel (Ni), lead (Pb), Titanium (Ti), or alloys thereof, but a material thereof is not limited thereto. The external electrodes 300 and 400 may be formed to have a single layer or a multilayer structure.

The filling portion 500 fills the recess R and covers the connection portions 310 and 410. For example, the present disclosure has a shape in which the connection portions 310 and 410 of the external electrodes 300 and 400 are disposed between the filling portion 500 and the internal surface of the recess R.

Outer surfaces of the filling section 500 may be disposed on substantially the same planes as the first and second surfaces 101 and 102 (e.g., both end surfaces of the body 100) and the third and fourth surfaces 103 and 104 (e.g., both side surfaces of the body 100) so as to be coplanar therewith. As an example, external electrodes 300 and 400 may be formed when the body forms part of a coil bar, and a space between adjacent connection portions of the bodies 100 in the coil bar may be filled with a material for forming a filling portion 500. In turn, full-dicing is performed, such that one surface of the filling portion 500 may be disposed on substantially the same plane as each of the first to fourth surfaces 101, 102, 103, and 104 of the body 100 formed during the full-dicing operation.

The filling portion 500 may include an insulating resin. The insulating resin may include epoxy, polyimide, liquid crystal polymer, and the like, alone or in combination, but a material of the insulating resin is not limited thereto.

The filling section 500 may further include magnetic powder particles dispersed in an insulating resin. The magnetic powder particles may be ferrite or metal magnetic powder particles.

The ferrite power particles may include at least one of, for example, spinel type ferrites such as ferrites that are Mg—Zn-based, Mn—Zn-based, Mn—Mg-based, Cu—Zn-based, Mg—Mn—Sr-based, Ni—Zn-based, hexagonal ferrites such as ferrites that are Ba—Zn-based, Ba—Mg-based, Ba—Ni-based, Ba—Co-based, Ba—Ni—Co-based, or the like, garnet ferrites such as Y-based ferrite, and Li-based ferrite.

Magnetic metal powder particles may include at least one selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particles may include at least one of pore ion power particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles, and Fe—Cr—Al-based alloy powder particles.

The metallic magnetic powder particles may be amorphous or crystalline. For example, the magnetic metal powder particles may be Fe—Si—B—Cr-based amorphous alloy powder particles, but is not limited thereto.

Each of the ferrite and the magnetic metal powder particles may have an average diameter of about 0.1 μm to about 30 μm, but an example of the average diameter is not limited thereto.

A cover layer 600 may be disposed on the first to fifth surfaces 101, 102, 103, 104, and 105 and the filling portion 500. Specifically, the cover layer 600 is formed to cover all components of the example embodiment previously described, except for the sixth surfaced 106 of the body 100, the pad portions 320 and 420 disposed on the sixth surface 106 of the body 100, and a region of the filling portion 500 exposed to a side of (e.g., and coplanar with) the sixth surface 106 of the body 100.

The cover layer 600 may include a thermoplastic resin such as a polystyrene-based thermoplastic resin, a vinyl acetate-based thermoplastic resin, a polyethylene-based thermoplastic resin, a polypropylene-based thermoplastic resin, a polyamide-based thermoplastic resin, a rubber-based thermoplastic resin, an acrylic-based thermoplastic resin, or the like, a thermosetting resin such as a phenolic thermosetting resin, an epoxy-based thermosetting resin, a urethane-based thermosetting resin, a melamine-based thermosetting resin, an alkyd-based thermosetting resin, or the like, a photosensitive resin, parylene, $SiO_x$, or $SiN_x$.

The cover layer 600 may be formed by laminating a cover film such as a dry film DF on the body 100 in which the filling portion is formed. Alternatively, the cover layer 600 may be formed by forming an insulating material on the body 100, in which the filling portion 500 is formed, by vapor deposition such as chemical vapor deposition (CVD).

The cover layer 600 may be formed to have a thickness ranging from 10 nm to 100 μm. When the thickness of the cover layer 600 is less than 10 nm, insulation characteristics may be reduced to cause an electric short-short between the connection portions 310 and 410 and/or the lead-out portions 231 and 232 and other external electronic components. When the thickness of the cover layer 600 is greater 100 μm, the total length, width, and thickness of the coil components are increased to be disadvantageous for thinning.

Although not illustrated in the drawings, an insulating layer, disposed along surfaces of the lead-out portions 231 and 232 except for one surface of the lead-out portions 231 and 232 exposed to the recess R, surfaces of the coil patterns 211 and 212, and the surface of the internal insulating layer IL, may be further included. The insulating layer may include an insulating material, such as parylene, to protect the lead-out portions 231 and 232 and the coil patterns 211 and 212 and to insulate the lead-out portions 231 and 232 and the coil patterns 211 and 212 from the body 100. The insulating material, included in the insulating layer, may be any insulating material and is not limited. The insulating layer may be formed by a method such as vapor deposition, or the like, but a method of forming the insulating layer is not limited thereto. For example, the insulating layer may be formed by laminating an insulating film on both surfaces of the internal insulating layer IL.

In the case of this embodiment, an additional insulating layer, distinguished from the above-mentioned cover layer 600 and formed in contact with at least one of the first to sixth surfaces 101, 102, 103, 104, 105, and 106 of the body 100, may be further included. As an example, when the additional insulating layer is formed on the sixth surface 106 of the body 100, the pad portions 320 and 420 of the external electrodes 300 and 400 extend from the connection portions 310 and 410, disposed on the internal surface of the recess R to a bottom surface of the additional insulating layer. The additional insulating layer may include a thermoplastic resin such as a polystyrene-based thermoplastic resin, a vinyl acetate-based thermoplastic resin, a polyethylene-based thermoplastic resin, a polypropylene-based thermoplastic resin, a polyamide-based thermoplastic resin, a rubber-based thermoplastic resin, an acrylic-based thermoplastic resin, or the like, a thermosetting resin such as a phenolic thermosetting resin, an epoxy-based thermosetting resin, a urethane-based thermosetting resin, a melamine-based thermosetting resin, an alkyd-based thermosetting resin, or the like, a photosensitive resin, parylene, $SiO_x$, or $SiN_x$. The additional insulating layer may be formed by laminating an insulating film on a surface of the body 100, by depositing an insulating material on a surface of the body using a thin-film process, or by applying an insulating resin on a surface of the body 100 using screen printing or the like.

Thus, the coil component 1000 according to this embodiment may easily implement a bottom electrode structure while maintaining a size of the coil component. For example, unlike a related art, the external electrodes are not formed on a body separated by full dicing, but are formed on the body in a coil bar state in which a plurality of bodies are connected to each other. Therefore, a defective rate may be significantly reduced as compared with a case in which external electrodes are individually formed on respective external electrodes.

Since the coil component 1000 according to this embodiment includes the external electrodes 300 and 400 which is not disposed on the first and second surfaces 101 and 102 (e.g., both end surfaces of the body 100) or the third and fourth surfaces 103 and 104 (e.g., both side surfaces of the body 100), a length and a width of the coil electronic component 100 may be prevented from increasing. In addition, since each of the external electrodes 300 and 400 is formed to have a relatively small thickness, a total thickness of the component 1000 may be reduced.

In this embodiment, the filling portion 500, including the insulating resin, may be formed in the recess R to prevent the external electrodes 300 and 400 from being electrically short-circuited to other external electronic components. In this case, when the coil component 1000 according to this embodiment is mounted on a substrate or the like, a bonding member such as a solder, or the like, may be prevented from extending to the first to fourth surfaces 101, 102, 103, and 104 of the body 100. In addition, when the filling portion 500 includes a magnetic material, the filling portion 500 may compensate for loss of the magnetic material of the body 100 due to the formation of the recesses R.

In this embodiment, since surface roughness of one surface of the lead-out portions 231 and 232, exposed to the recess R, is relatively high, bonding force between the lead-out portions 231 and 232 and the first and second external portions 300 and 400 may be improved.

Modified Example of First Embodiment

Figure 6:
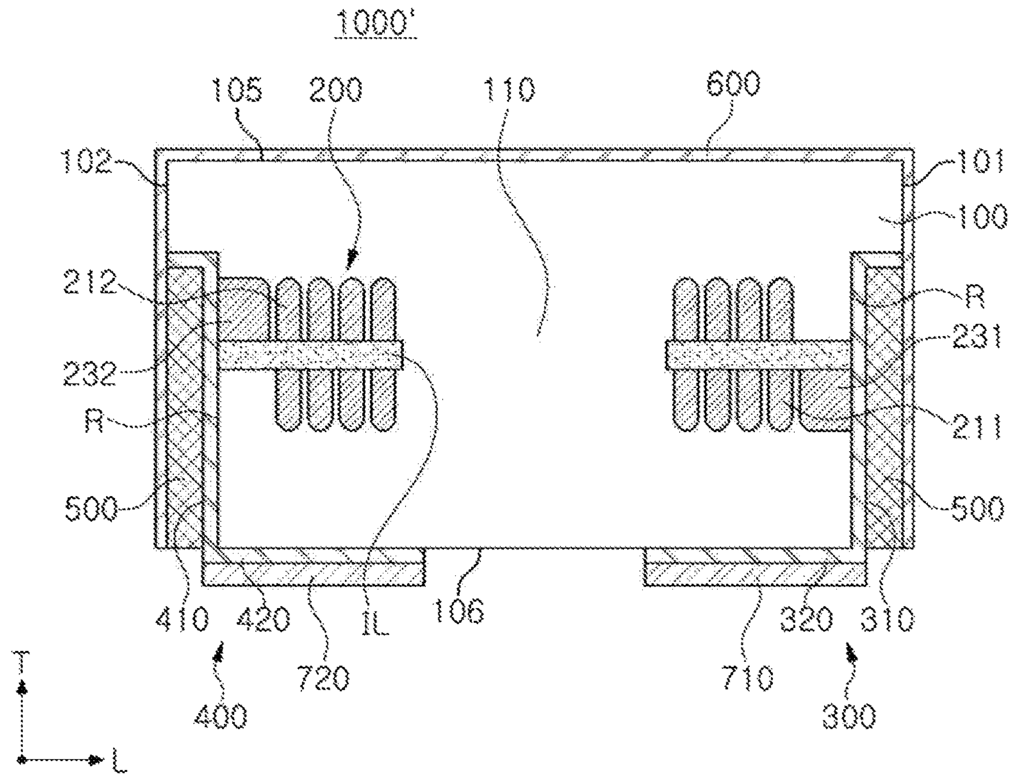
FIG. 6 illustrates a first modified example of the coil component according to the first embodiment in the present disclosure, and corresponds to a cross-sectional view taken along line I-I' of FIG. 1.
Figure 7:
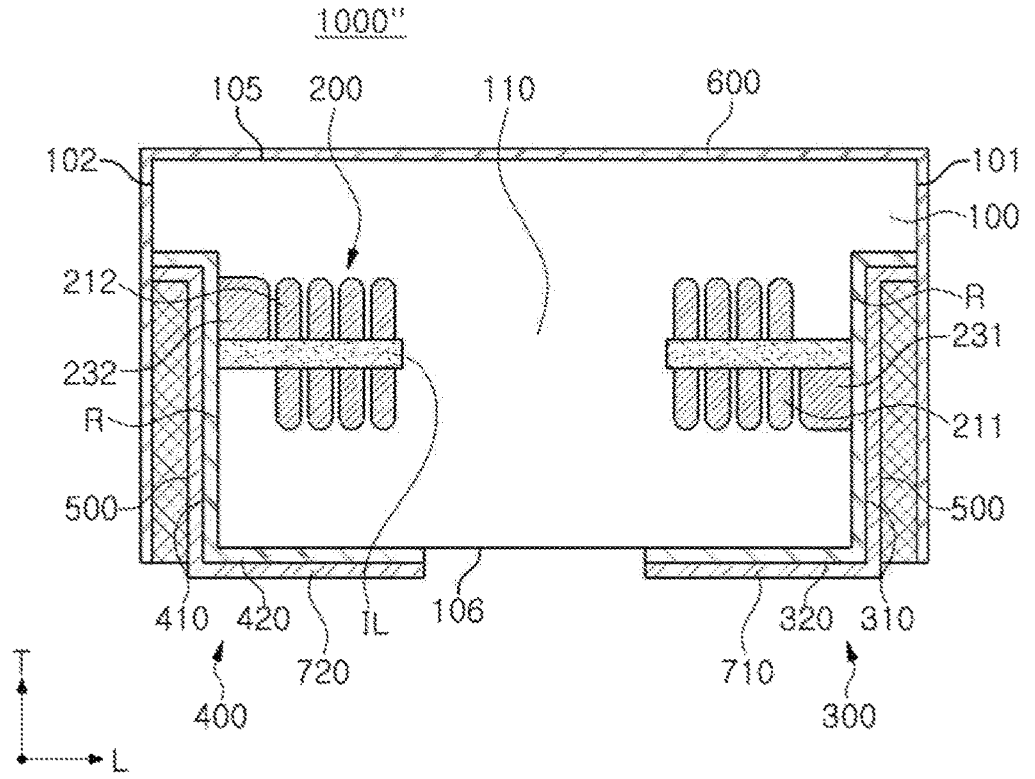
FIG. 7 illustrates a second modified example of the coil component according to the first embodiment in the present disclosure, and corresponds to a cross-sectional view taken along line I-I' of FIG. 1.

FIG. 6 illustrates a first modified example of the coil component according to the first embodiment in the present disclosure, and corresponds to a cross-sectional view taken along line I-I' of FIG. 1. FIG. 7 illustrates a second modified example of the coil component according to the first embodiment in the present disclosure, and corresponds to a cross-sectional view taken along line I-I' of FIG. 1.

Referring to FIGS. 1 to 7, coil components 1000' and 1000" according to first and second modified embodiments of the first embodiment in the present disclosure further includes plating layers 710 and 720, as compared to the coil component 1000 according to the first embodiment. Therefore, the first and second modified embodiments will only be described with respect to the plating layers 710 and 720, which is a difference with respect to the first embodiment. The descriptions of the first embodiment may be applied, as is, to the other elements of the first and second modified embodiments.

The coil component 1000' according to the first modified embodiment further includes plating layers 710 and 720 disposed on the pad portions 320 and 420, respectively, of the external electrodes 300 and 400.

The plating layers 710 and 720 may be formed of at least one selected from the group consisting of copper (Cu), aluminum (Al), silver (Ag), tin (Sn), gold (Au), nickel (Ni), lead (Pb), titanium (Ti), and alloys thereof, but a material of the plating layers 710 and 720 is not limited thereto. The plating layers 710 and 720 may be formed to have a single-layer structure or a multilayer structure. For example, the plating layer 710, formed on the first pad portion 320 of the first external electrode 300, may include a first plating layer, including nickel (Ni), and a second plating layer including tin (Sn). The plating layer may include a plurality of layers or a single layer.

In the case of this modified example, the plating layers 710 and 720, disposed on the pad portions 320 and 420, may be formed by individualizing each component using full-dicing and forming a plating layer in each component after forming the cover layer 600 in each component as described above.

In the case of the coil component 1000" according to the second modified example, the plating layers 710 and 720 extend between the respective coupling portions 310 and 410 and the filling portion 500. In this modified example, the plating layers 710 and 720 may be extended between the respective connection portions 310 and 410 and the filling portion 500 by forming the plating layers 710 and 720 after forming the external electrodes 300 and 400 in a coil bar state and prior to forming the filling portion 500 or performing full-dicing.

Second Embodiment

Figure 8:
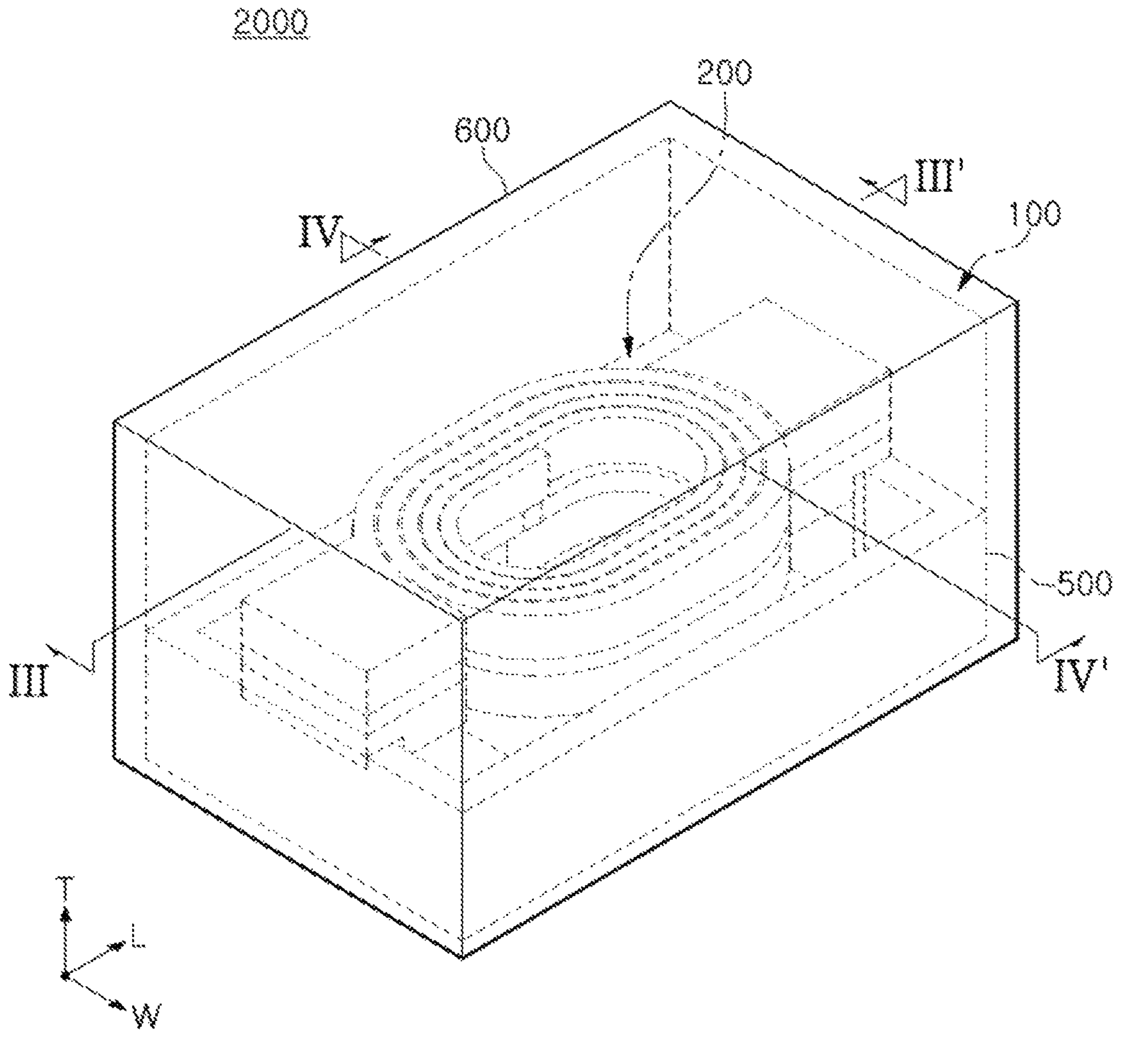
FIG. 8 is a schematic diagram of a coil component according to a second embodiment in the present disclosure.
Figure 9:
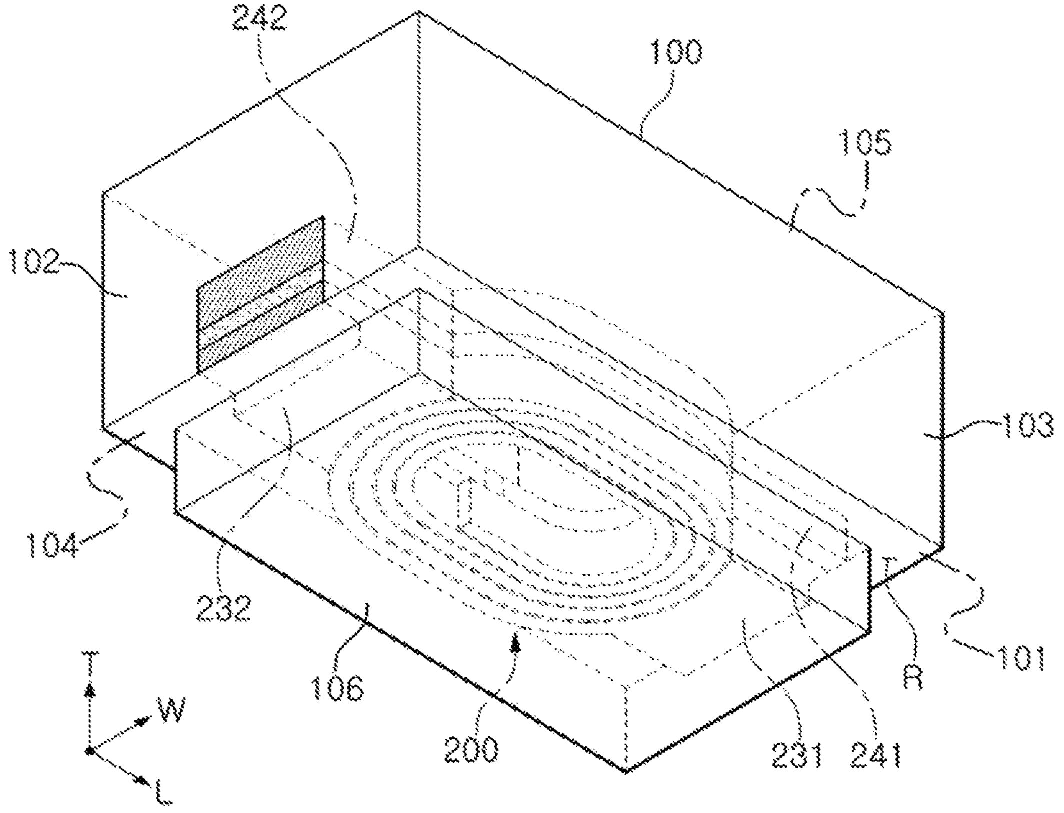
FIG. 9 is a diagram showing the coil component of FIG. 8 and excluding some portions thereof, when viewed from a lower side of the coil component of FIG. 8.
Figure 10:
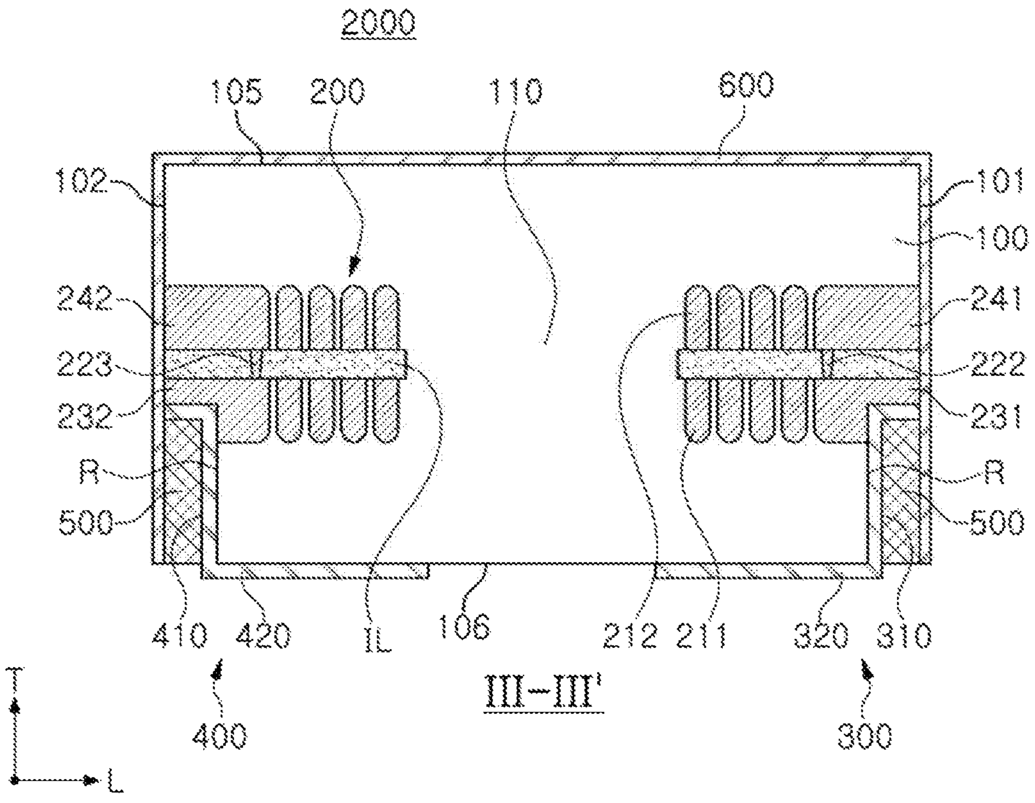
FIG. 10 is a cross-sectional view of the coil component taken along line III-III' of FIG. 8.
Figure 11:
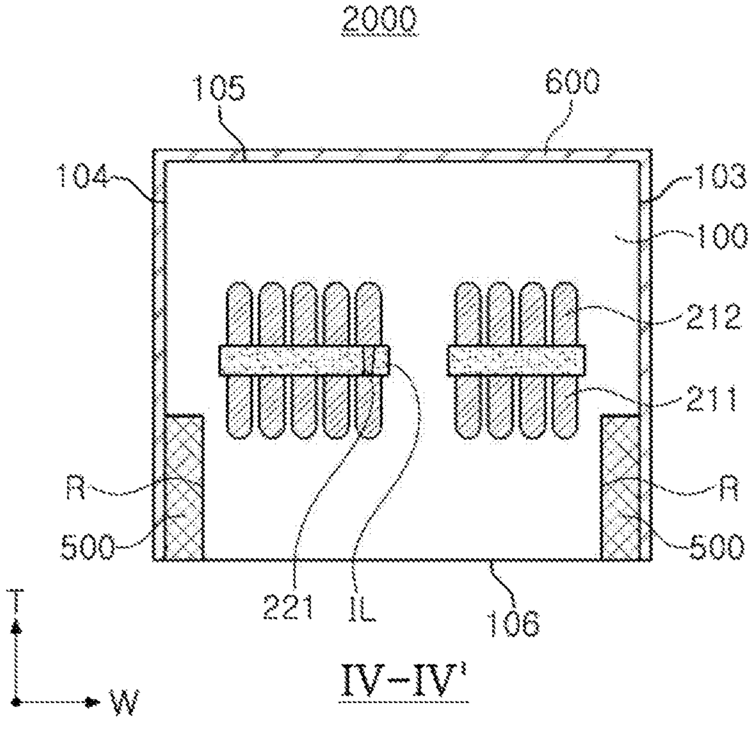
FIG. 11 is a cross-sectional view of the coil component taken along line IV-IV' of FIG. 8.
Figure 12:
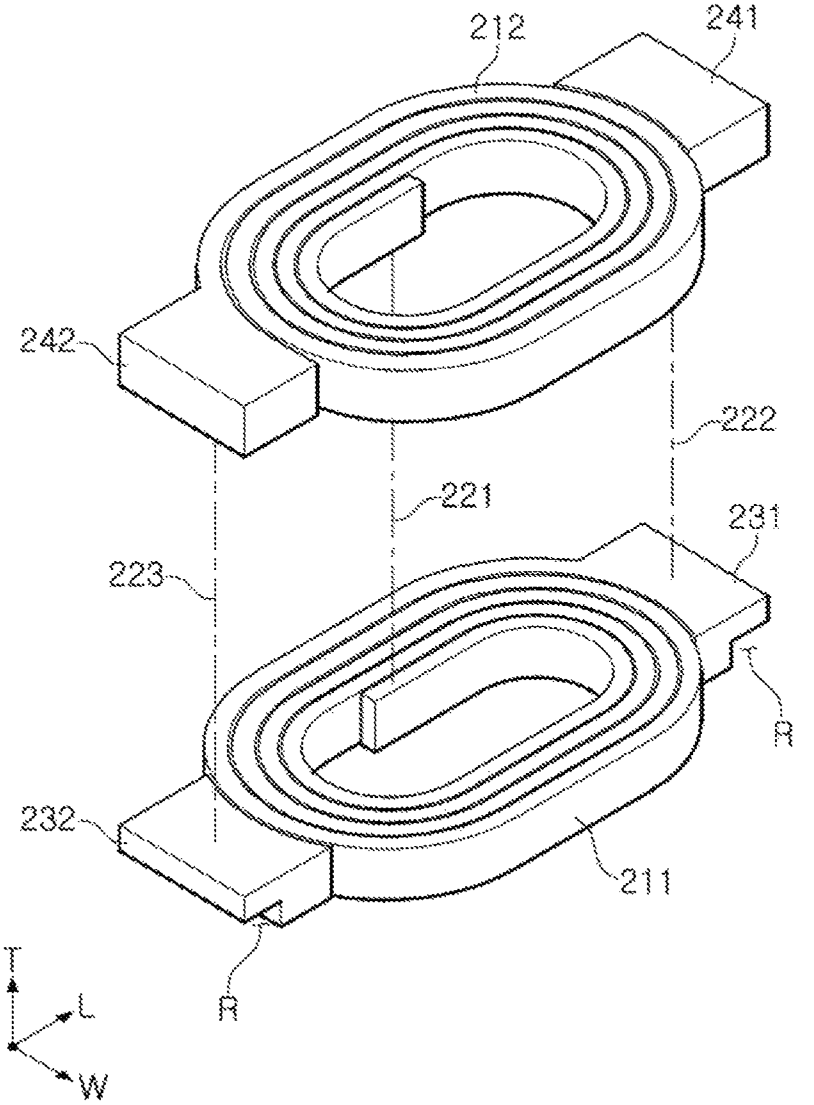
FIG. 12 is an exploded view of a coil portion of the coil component of FIG. 8.

FIG. 8 is a schematic diagram of a coil component according to a second embodiment in the present disclosure. FIG. 9 is a diagram showing the coil component of FIG. 8 and excluding some portions thereof, when viewed from a lower side of the coil component of FIG. 8. FIG. 10 is a cross-sectional view of the coil component taken along line III-III' of FIG. 8. FIG. 11 is a cross-sectional view of the coil component taken along line IV-IV' of FIG. 8. FIG. 12 is an exploded view of a coil portion of the coil component of FIG. 8.

Referring to FIGS. 1 to 12, a coil component 2000 according to this embodiment is different only in a coil portion 200, as compared with the coil component 1000 according to the first embodiment in the present disclosure. Therefore, this embodiment will be described with respect to only the coil portion 200, which is different from the coil portion of the first embodiment. The descriptions of the first embodiment and the modified embodiments may be applied, as it is, to the other elements of this embodiment.

The coil portion 200, applied to this embodiment, includes coil patterns 211 and 212, vias 221, 222 and 223, lead-out portions 231 and 232, and auxiliary lead-out portions 241 and 242.

Specifically, on the basis of FIGS. 9 to 11, the first coil pattern 211, the first lead-out portion 231, and the second lead-out portion 232 are disposed on a bottom surface of an internal insulating layer IL facing towards a sixth surface 106 of a body 100. The second coil pattern 212, the first auxiliary lead-out portion 241, and the second auxiliary lead-out portion 242 are disposed on a top surface of the internal insulating layer IL opposite the bottom surface of the internal insulating layer IL.

On the basis of FIGS. 9 to 11, the first coil pattern 211 is in contact with (e.g., in direct contact with) and connected to the first lead-out portion 231 on the bottom surface of the internal insulating layer IL, and the first coil pattern 211 and the first lead-out portion 231 are spaced apart from the second lead-out portion 232. The second coil pattern 212 is in contact with and connected to the second auxiliary lead-out portion 242 on the top surface of the internal insulating layer IL, and the second coil pattern 212 and the second auxiliary lead-out portion 242 are spaced apart from the first auxiliary lead-out portion 241. A first via 221 penetrates through the internal insulating layer IL to be in contact with the first coil pattern 211 and the second coil pattern 212, a second via 222 penetrates through the internal insulating layer IL to be in contact with the first lead-out portion 231 and the first auxiliary lead-out portion 241, and a third via 223 penetrates through the internal insulating layer IL to be in contact with the second lead-out portion 232 and the second auxiliary lead-out portion 242. Thus, the coil portion 200 may generally serve as a single coil.

Each of the lead-out portions 231 and 232 is exposed to a bottom surface and an internal wall of the recess R. In a process of forming the recess R, a portion of each of the lead-out portions 231 and 232 is removed together with a portion of the body 100. For example, the recess R extends to the first lead-out portion 231 and the second lead-out portion 232. Accordingly, the first and second external electrodes 300 and 400 are formed in contact with the lead-out portions 231 and 232, exposed to the bottom surface and the internal wall of the recess R, to connect the coil portion 200 to the first and second external electrodes 300 and 400.

In this embodiment, the lead-out portions 231 and 232 and the auxiliary lead-out portions 241 and 242 are exposed to first and second surfaces 101 and 102 (e.g., both end surfaces of the body 100), respectively. For example, the first lead-out portion 231 is exposed to the first surface 101 of the body 100, and the second lead-out portion 232 is exposed to the second surface 102 of the body 100. The first auxiliary lead-out portion 241 is exposed to the first surface 101 of the body 100, and the second auxiliary lead-out portion 242 is exposed to the second surface 102 of the body 100. As a result, the first lead-out portion 231 is continuously exposed to the internal surface of the recess R, the bottom surface of the recess R, and the first surface 101 of the body 100, and the second lead-out portion 232 is continuously exposed to the inner surface of the recess R, the bottom surface of the recess R, and the second surface 102 of the body 100.

At least one of the coil patterns 211 and 212, the vias 221, 222 and 223, the lead-out portions 231 and 232, and the auxiliary lead-out portions 241 and 242 may include at least one conductive layer.

For example, when the second coil pattern 212, the vias 221, 222, and 223, and the auxiliary lead-out portions 241 and 242 are formed on the other surface side of the internal insulating layer IL by plating, each of the coil pattern 212, the vias 221, 222, and 223, and the auxiliary lead-out portions 241 and 242 may include a seed layer such as an electroless plating layer and an electroplating layer. The electroplating layer may have a single-layer structure or a multilayer structure. The electroplating layer of the multilayer structure may be formed in a conformal film structure in which one electroplating layer is covered with another electroplating layer, and may be formed so that another plating layer is laminated only on one surface of one electroplating layer. The seed layer of the second coil pattern 212, the seed layer of the vias 221, 222, and 223 and the seed layer of the auxiliary lead-out portions 241 and 242 may be integrally formed, such that boundaries therebetween may not be formed, but the disclosure is not limited thereto.

As another example, when the first coil pattern 211 and the lead-out portions 231 and 232, disposed on a bottom surface side of the internal insulating layer IL, and the second coil pattern 212 and the auxiliary lead-out portions 241 and 242, disposed on a top surface side of the internal insulating layer IL, are separately formed and are then laminated on the internal insulating layer IL to form the coil portion 200 on the basis of directions of FIGS. 9 to 11, the vias 221, 222, and 223 may include a high-melting point metal layer and a low-melting point metal layer having a melting point lower than a melting point of the high-melting point metal layer. The low-melting point metal layer may be formed of a solder including lead (Pb) and/or tin (Sn). At least a portion of the low-melting point metal layer may be melted by a pressure and a temperature during the collective lamination, such that an inter-metallic compound (IMC) layer may be formed in a boundary between the second coil pattern 212 and/or the auxiliary lead-out portions 241 and 242 and the low-metal point metal layer.

As an example, the coil patterns 211 and 212, the lead-out portions 231 and 232, and the auxiliary lead-out portions 241 and 242 may be formed to protrude from the bottom and top surfaces of the internal insulating layer IL, as illustrated in FIGS. 9 to 11. As another example, the first coil pattern 211 and the lead-out portions 231 and 232 may be formed to protrude from the bottom surface of the internal insulating layer IL, and the second coil pattern 212 and the auxiliary lead-out portions 241 and 242 may be embedded in the top surface of the internal insulating layer IL such that top surfaces of the second coil pattern 212 and the auxiliary lead-out portions 241 and 242 may be exposed to the top surface of the internal insulating layer IL. In this case, a concave portion may be formed in the top surface of the second coil pattern 212 and/or the top surfaces of the auxiliary lead-out portions 241 and 242, such that the top surface of the internal insulting layer IL, the top surface of the second coil pattern 212, and/or the top surfaces of the auxiliary lead-out portions 241 and 242 may not be disposed on the same plane. As another example, the second coil pattern 212 and the auxiliary lead-out portions 241 and 242 may be formed to protrude from the top surface of the internal insulating layer IL, and the first coil pattern 211 and the lead-out portions 231 and 232 may be embedded in the bottom surface of the internal insulating layer IL, such that bottom surfaces of the first coil pattern 211 and the lead-out portions 231 and 232 may be exposed to the bottom surface of the internal insulating layer IL. In this case, a concave portion may be formed in the bottom surface of the first coil pattern 212 and/or the bottom surfaces of the lead-out portions 231 and 232, such that the bottom surface of the internal insulating layer IL, the bottom surface of the first coil pattern 212, and/or the bottom surfaces of the lead-out portions 231 and 232 may not be disposed on the same plane.

The coil patterns 211 and 212, the lead-out portions 231 and 232, the auxiliary lead-out portions 241 and 242, and the vias 221, 222, and 223 may be formed of a conductive material such as copper (Cu), aluminum (Al), silver (Ag), tin (Sn), gold (Au), nickel (Ni), lead (Pb), titanium (Ti), or alloys thereof, but a material thereof is not limited thereto.

Modified Example of Second Embodiment

Figure 13:
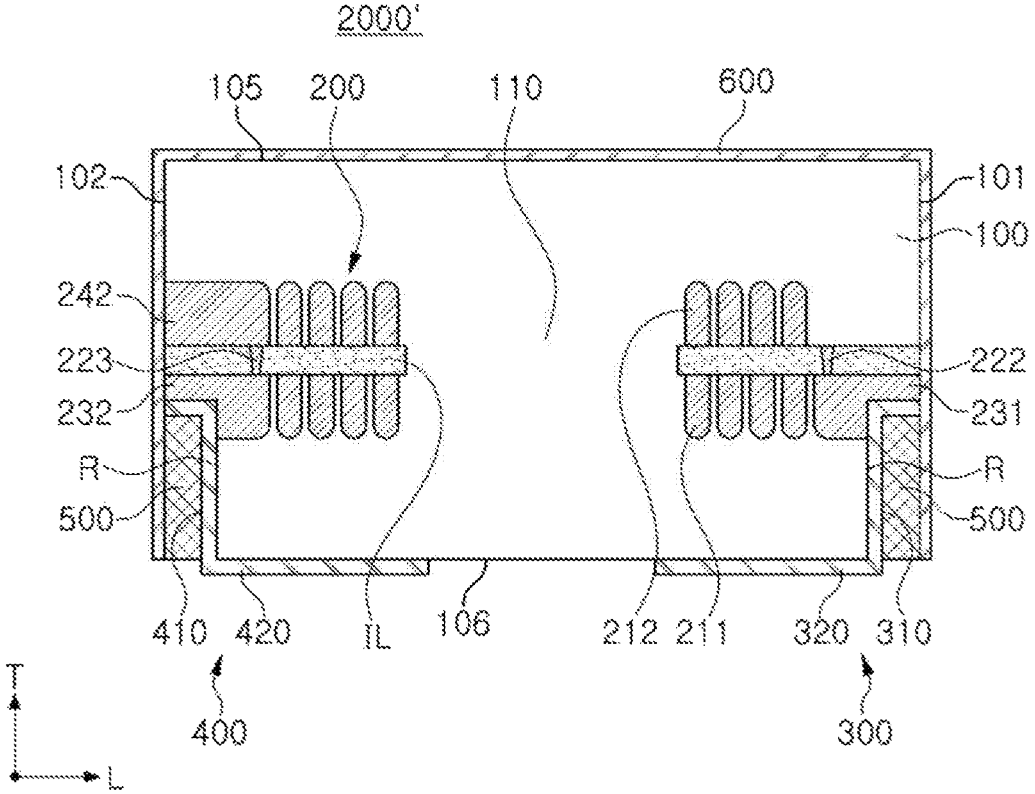
FIG. 13 illustrates a modified example of the coil component according to the second embodiment in the present disclosure, and corresponds to a cross-sectional view taken along line III-III' of the coil component of FIG. 8.

FIG. 13 illustrates a modified example of the coil component according to the second embodiment in the present disclosure, and corresponds to the cross-sectional view taken along line III-III' of the coil component of FIG. 8.

Referring to FIGS. 8 to 13, a coil component 2000' according to this embodiment has a coil portion 200 that is different from that of the coil component 2000 according to the second embodiment in the present disclosure. Therefore, this embodiment will be described with respect to only the coil portion 200, which is a difference from the second embodiment. The descriptions of the second embodiment may be applied, as it is, to the other elements of this embodiment.

Referring to FIG. 13, a coil portion 200, applied to this modified example, does not include a first auxiliary lead-out portion 241, unlike the second embodiment.

Referring to FIGS. 10 and 12, since the first auxiliary lead-out portion 241 provides no necessary electrical connection between components of the coil portion 200, the first auxiliary lead-out portion 241 can be omitted as shown in the modified example of FIG. 13.

As described above, according to the present disclosure, a coil component may decrease in size.

In addition, according to the present disclosure, an electrode structure may be easily formed.

Moreover, according to the present disclosure, loss of a magnetic material may be significantly reduced.

While example embodiments have been shown and described above, it will be apparent to those skilled in the art that modifications and variations could be made without departing from the scope of the present disclosure as defined by the appended claims.

What is claimed is:

1. A coil component comprising:

a body having one surface and another surface opposing each other, opposing end surfaces each connecting the one surface and the another surface to each other, and opposing side surfaces each connecting the end surfaces to each other, wherein the end surfaces extend to the one surface;

an internal insulating layer embedded in the body;

a coil portion disposed on at least one surface of the internal insulating layer and including first and second lead-out portions;

first and second external electrodes, each including a pad portion disposed on the one surface of the body, and each including a connection portion disposed to be not parallel with the pad portion and connected between the pad portion and a respective one of the first and second lead-out portions, wherein an end of the connection portion connecting the connection portion to the pad portion is in line with the one surface;

a recess disposed in each end surface of the body to expose the first and second lead-out portions; and an insulating portion disposed in the recess without extending to the another surface, wherein a roughness of surfaces of the first and second lead out portions through the recess is greater than a roughness of surfaces of the first and second lead-out portions not exposed through the recess.

2. The coil component of claim 1, wherein the insulating portion has surfaces each disposed on a same plane as a respective one of the opposing end surfaces of the body and the opposing side surfaces of the body.

3. The coil component of claim 1, wherein the body includes a magnetic material and a resin material, and the insulating portion includes an insulating resin having magnetic powder particles dispersed therein.

4. The coil component of claim 1, wherein each of the first and second external electrodes is disposed along an internal surface of the recess and on the one surface of the body.

5. The coil component of claim 1, wherein the connection portion and the pad portion of each of the first and second external electrodes are integrally formed.

6. The coil component of claim 1, further comprising:

a plating layer disposed on the pad portion of each of the first and second external electrodes.

7. The coil component of claim 6, wherein each plating layer is disposed to extend between the connection portion of the respective first or second external electrode and the insulating portion.

8. The coil component of claim 1, wherein the first and second lead-out portions are spaced apart from each other on one surface of the internal insulating layer facing the one surface of the body, and the coil portion further comprises:

a first coil pattern disposed on the one surface of the internal insulating layer to be in contact with the first lead-out portion and spaced apart from the second lead-out portion;

a second coil pattern disposed on another surface of the internal insulating layer opposing the one surface of the internal insulating layer; and a via penetrating through the internal insulating layer to connect the first and second coil patterns to each other.

9. The coil component of claim 8, wherein the coil portion further comprises a first auxiliary lead-out portion disposed on the another surface of the internal insulating layer to be in contact with the second coil pattern and connected to the second lead-out portion.

10. The coil component of claim 1, wherein the coil component further includes a cover insulating layer covering the body and the insulating portion.

11. The coil component of claim 10, wherein the cover insulating layer is not disposed on the one surface of the body, and a portion of the cover insulating layer is disposed on the another surface opposing the one surface of the body.

12. A coil component comprising:

a body having one surface and another surface opposing each other, opposing end surfaces each connecting the one surface and the another surface to each other, and opposing side surfaces each connecting the end surfaces to each other;

an internal insulating layer embedded in the body;

a coil portion disposed on at least one surface of the internal insulating layer and including first and second lead-out portions;

first and second external electrodes, each including a pad portion disposed on the one surface of the body, and each including a connection portion disposed to be not parallel with the pad portion and connected between the pad portion and a respective one of the first and second lead-out portions;

a recess disposed in each end surface of the body to expose the first and second lead-out portions;

an insulating portion covering the connection portion; and a cover insulating layer covering the body and the insulating portion, wherein a roughness of surfaces of the first and second lead out portions through the recess is greater than a roughness of surfaces of the first and second lead-out portions not exposed through the recess, wherein a first end extending from a surface of each of the connection portions to a corresponding end surface is parallel to the one surface and a distance between the first end of each of the connection portions and the one surface is greater than a distance between the internal insulating layer and the one surface.

13. The coil component of claim 12, wherein the cover insulating layer is not disposed on the one surface of the body, and a portion of the cover insulating layer is disposed on the another surface opposing the one surface of the body.

14. The coil component of claim 12, wherein the body includes a magnetic material and a resin material, and the insulating portion includes an insulating resin having magnetic powder particles dispersed therein.

15. The coil component of claim 12, wherein the insulating portion is disposed in the recess.

16. The coil component of claim 15, wherein the recess has an internal wall surface parallel with the opposing end surfaces, and a bottom surface parallel with the opposing one surface and the another surface of the body, and the first and second lead-out portions are each exposed to the internal wall surface and to the bottom surface of the recess along a respective one of the opposing end surfaces of the body.

17. The coil component of claim 15, wherein the recess has an internal wall surface parallel with the opposing end surfaces, and a bottom surface parallel with the opposing one surface and the another surface of the body, and the first and second lead-out portions are each exposed to the internal wall surface and are spaced apart from the bottom surface of the recess along a respective one of the opposing end surfaces of the body.

18. The coil component of claim 15, wherein the recess is further disposed in each of the opposing side surfaces to extend to the one surface of the body.

19. The coil component of claim 12, wherein the coil includes first and second coil patterns disposed on opposing first and second surfaces of the internal insulating layer, and a via penetrating through the internal insulating layer and connecting the first and second coil patterns to each other.

* * * * *